(12) United States Patent
Inami et al.

(10) Patent No.: US 10,927,887 B2
(45) Date of Patent: Feb. 23, 2021

(54) SLIDING MEMBER AND THRUST WASHER (71) Applicant: DAIDO METAL COMPANY LTD., Nagoya (JP)

(72) Inventors: Shigeru Inami, Nagoya (JP); Tetsuya Ogawa, Nagoya (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 186 days.

(21) Appl. No.: 15/569,059

(22) PCT Filed: Feb. 24, 2016

(86) PCT No.: PCT/JP2016/055442
§ 371 (c)(1),
(2) Date: Oct. 24, 2017

(87) PCT Pub. No.: WO2016/174909
PCT Pub. Date: Nov. 3, 2016

(65) Prior Publication Data
US 2018/0135692 A1   May 17, 2018

(30) Foreign Application Priority Data

Apr. 27, 2015 (JP) .............................. JP2015-090318
May 11, 2015 (JP) .............................. JP2015-096435

(51) Int. Cl.
*B32B 3/26* (2006.01)
*B32B 3/30* (2006.01)
*F16C 17/02* (2006.01)
*F16C 17/04* (2006.01)
*F16C 33/20* (2006.01)

(52) U.S. Cl.
CPC ............ *F16C 17/04* (2013.01); *F16C 33/203* (2013.01); *F16C 33/206* (2013.01)

(58) Field of Classification Search
CPC ........ F16C 17/02; F16C 17/04; F16C 33/203; F16C 33/20; F16C 17/206; F04B 27/08; B32B 3/263; B32B 3/30; B32B 2307/746
See application file for complete search history.

(56) References Cited

U.S. PATENT DOCUMENTS

2003/0031389 A1* 2/2003 Kanayama ........... C09D 179/08
                                                          384/42
2006/0083451 A1* 4/2006 Kawagoe .............. F16C 33/201
                                                          384/276

(Continued)

FOREIGN PATENT DOCUMENTS

JP    2002061652 A    2/2002
JP    2004211859 A    7/2004

(Continued)

OTHER PUBLICATIONS

Extended European Search Report dated Nov. 12, 2018, for European Patent Application No. 16786186.3.

(Continued)

*Primary Examiner* — Joanna Pleszczynska
(74) *Attorney, Agent, or Firm* — Karceski IP Law, PLLC (57) ABSTRACT

A resin coating layer has a shape line that indicates the shape of a surface and is divided by virtual straight lines parallel to the X axis and setting an area of recessed sections that protrudes below the virtual straight lines and an area of protruding sections that protrudes above the virtual straight lines. A virtual straight line at a position at which the area totals for the area of recessed sections and the area of protruding sections are equal is defined as the average line for unevenness. Areas that protrude downwards from this average line for unevenness are defined as recessed sections and areas that protrude above this average line for unevenness are defined as protruding sections. The average area Sa (Continued)

for one recessed section is 4-120 $\mu m^2$ and the number M of recessed sections between two points having a distance of 1 mm therebetween is 3-20.

10 Claims, 6 Drawing Sheets

(56) References Cited

U.S. PATENT DOCUMENTS

2012/0308168 A1* 12/2012 Watanabe ............. F16C 33/206
384/276
2014/0303050 A1* 10/2014 Tomikawa ........... C10M 103/06
508/108

FOREIGN PATENT DOCUMENTS

| | | |
|---|---|---|
| JP | 2005344736 A | 12/2005 |
| JP | 2014070662 A | 4/2014 |
| WO | 02/075172 A1 | 9/2002 |

OTHER PUBLICATIONS

Japanese Office Action dated Jan. 8, 2019, for Japanese Patent Application No. 2015-096435.
International Search Report dated May 17, 2016 for International Patent Application No. PCT/JP2016/055442.

* cited by examiner

| | | AREA OF RECESS Sa (μm²) | NUMBER OF RECESSES M (NUMBER) | PRODUCT A (μm²) | GRADIENT R | HARDNESS HV | COEFFICIENT OF FRICTION |
|---|---|---|---|---|---|---|---|
| EXAMPLE ARTICLE | 1 | 4 | 3 | 12 | 0.001 | 60 | 0.038 |
| | 2 | 4 | 20 | 80 | 0.026 | 60 | 0.038 |
| | 3 | 120 | 4 | 480 | 0.031 | 60 | 0.039 |
| | 4 | 120 | 20 | 2400 | 0.768 | 60 | 0.040 |
| | 5 | 10 | 3 | 30 | 0.001 | 60 | 0.033 |
| | 6 | 80 | 10 | 800 | 0.128 | 60 | 0.035 |
| | 7 | 30 | 3 | 90 | 0.004 | 60 | 0.027 |
| | 8 | 120 | 3 | 360 | 0.007 | 60 | 0.025 |
| | 9 | 5 | 18 | 90 | 0.049 | 60 | 0.028 |
| | 10 | 25 | 18 | 450 | 0.144 | 60 | 0.029 |
| | 11 | 60 | 5 | 300 | 0.044 | 60 | 0.024 |
| | 12 | 9 | 10 | 90 | 0.010 | 60 | 0.019 |
| | 13 | 45 | 10 | 450 | 0.040 | 60 | 0.020 |
| | 14 | 80 | 3 | 240 | 0.015 | 60 | 0.017 |
| | 15 | 80 | 5 | 400 | 0.025 | 60 | 0.016 |
| | 16 | 18 | 5 | 90 | 0.010 | 60 | 0.013 |
| | 17 | 30 | 6 | 180 | 0.025 | 50 | 0.010 |
| | 18 | 50 | 8 | 400 | 0.040 | 10 | 0.012 |
| COMPARATIVE EXAMPLE ARTICLE | 1 | 4 | 21 | | | 30 | 0.055 |
| | 2 | 121 | 3 | | | | 0.055 |

FIG. 7

SLIDING MEMBER AND THRUST WASHER

CROSS-REFERENCE TO RELATED APPLICATION(S)

This is a National Stage Entry into the United States Patent and Trademark Office from International PCT Patent Application No. PCT/JP2016/055442, having an international filing date of Feb. 24, 2016, and which claims the benefit of and priority to both Japanese Patent Application No. 2015-090318, filed on Apr. 27, 2015, and Japanese Patent Application No. 2015-096435, filed on May 11, 2015, the entire contents of all of which are incorporated herein by reference.

FIELD OF THE INVENTION

The present invention relates to a sliding member and a thrust washer.

BACKGROUND OF THE INVENTION

A rotating shaft member needs to be supported not only in the rotational direction of the shaft member but also in the axial direction thereof. As a bearing member that supports the shaft member in the axial direction, a thrust washer, such as that disclosed in Japanese Patent Laid-Open No. 2014-070662, is known. The thrust washer supports the axial load of the rotating shaft member. The thrust washer disclosed in Patent Literature 1 has a resin coating layer on the slide surface in contact with the shaft member. In Japanese Patent Laid-Open No. 2014-070662, the resin coating layer has a central portion raised higher than both ends in the radial direction of the thrust washer in a cross section in the radial direction, that is, a cross section in the direction from the inner circumferential side toward the outer circumferential side. The thus shaped resin coating layer having the varying macroscopic thickness allows reduction in local contact between the shaft member and the thrust washer and damage resulting from the contact.

However, as an internal combustion engine and other apparatus including a bearing member and a shaft member, that is, a sliding member and a counterpart member need higher performance and more advanced functions, reduction in the weight of the shaft member causes tendencies toward decrease in the rigidity of the shaft member and increase in the contact pressure between the shaft member and the bearing member. In particular, an internal combustion engine repeats stopping and starting the operation thereof from a viewpoint of reduction in fuel consumption in recent years. The chances of the shaft member and the bearing member coming into contact with each other via no sufficiently thick oil film therefore increase, and frictional resistance therefore tends to increase. As a result, the friction between the shaft member and the bearing member is required to further decrease.

SUMMARY OF THE INVENTION

In view of the situations described above, an object of the present invention is to provide a sliding member and a thrust washer that allow further reduction in friction.

To achieve the object described above, a sliding member according to an embodiment of the present invention includes a base layer and a resin coating layer provided on a slide surface of the base layer.

The resin coating layer being configured in that;

A shape line is so defined as to represent a shape of a surface of the resin coating layer on a side opposite the base layer by using an X-Y coordinate system formed of an X axis representing a position between arbitrary two points on the surface and a Y axis perpendicular to the X axis and representing a thickness direction of the resin coating layer, the shape line is divided by an imaginary straight line parallel to the X axis to set recessed regions that protrude downward from the imaginary straight line and protruding regions that protrude upward from the imaginary straight line, and the imaginary straight line so positioned that a sum of areas of the recessed regions is equal to a sum of areas of the protruding regions is defined as a protrusion and recess average line, regions that protrude downward from the protrusion and recess average line are defined as recesses, and regions that protrude upward from the protrusion and recess average line are defined as protrusions, an average area Sa per recess ranges from 4 to 120 $\mu m^2$, and a number M of recesses between the two points that are separate from each other by a distance of 1 mm ranges from 3 to 20.

The present inventors have found that the recesses defined as described above affect the friction against a counterpart member and formation of an oil film. That is, the recesses, which form the shape line and are defined by the protrusion and recess average line, cannot hold a sufficient amount of lubricant for lubrication when the average area Sa decreases. Similarly, the thus defined recesses do not allow a sufficient amount of lubricant to be filled in the recesses when the average area Sa is too large. In the case where a sufficient amount of lubricant is not held or filled, the lubricant cannot be smoothly supplied to the slide surface, preventing formation of an oil film between the slide surface and the counterpart member. Further, when the number M of recesses defined as described above between arbitrary two points decreases, the recesses cannot hold a sufficient amount of lubricant, resulting in prevention of formation of an oil film. On the other hand, when the number M of recesses between the arbitrary two points increases, the contact resistance between the resin coating layer and the counterpart member increases, resulting in an increase in friction. Controlling the defined recesses in the resin coating layer therefore allows reduction in the friction against the counterpart member.

In the sliding member according to the present embodiment, the average area Sa per recess preferably ranges from 10 to 80 $\mu m^2$.

In the sliding member according to the present embodiment, the number M of recesses between the two points preferably ranges from 3 to 10.

In the sliding member according to the present embodiment, a product A of the average area Sa per recess and the number M of recesses or $A = Sa \times M$ preferably ranges from 90 to 450 $\mu m^2$.

In the sliding member according to the present embodiment, the product A preferably ranges from 120 to 300 $\mu m^2$.

In the present embodiment, hardness of the resin coating layer is preferably smaller than or equal to 50 HV.

Setting the hardness of the resin coating layer as described above allows reduction in the contact resistance between the resin coating layer and the counterpart member. The friction can therefore be reduced.

A thrust washer according to the present embodiment is the sliding member having the configuration described above.

In the present embodiment, in each of the recesses, an imaginary straight line L is so defined as to connect a bottom of the recess to a peak of the protrusion adjacent to the recess, and an average gradient R of the straight lines L ranges from 0.01 to 0.04. In a case where n straight lines L are present, the average of the gradients of the n lines is the average gradient R. The thus calculated average gradient R desirably satisfies $0.01 \leq R \leq 0.04$.

The average gradient R of the straight lines L between adjacent recesses is thus set. Setting the average gradient R of the straight lines L at an appropriate value prompts the lubricant held in the recesses to form an oil film. The greater the average gradient R of the straight lines L, the more unlikely the lubricant held in the recesses exit out of the recesses, resulting in a tendency to insufficient formation of an oil film. On the other hand, the smaller the average gradient R of the straight lines L, the more insufficient the amount of lubricant held in the recesses, resulting in a tendency to insufficient formation of an oil film.

Therefore, controlling the relationship between the recesses and the protrusions as described above can facilitate formation of an oil film and lower the coefficient of friction.

The thrust washer according to the present embodiment is the sliding member having the configuration described above, and the straight lines L described above extend along a direction in which the thrust washer rotates relative to a counterpart member.

As a result, rotation of the thrust washer relative to the counterpart member prompts the lubricant held in the recesses to form an oil film. The friction can therefore be reduced.

The resin coating layer having the configuration described above is useful in contributing to reduction in friction on a slide portion.

Further, the resin coating layer having the configuration described above is preferably formed by using paint having a controlled aggregation state of additive particles.

An internal combustion engine including the sliding member described above, in which the coefficient of friction is reduced, is suitable also for specifications in which the internal combustion engine repeats stopping and starting the operation thereof.

DESCRIPTION OF EMBODIMENTS

An embodiment of a sliding member will be described below with reference to the drawings.

Figure 1:
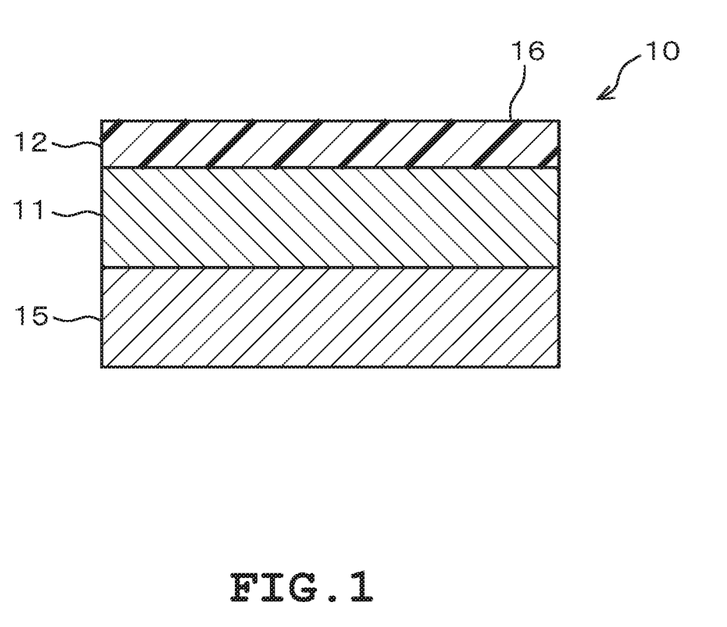
FIG. 1 is a diagrammatic view showing a cross section of a sliding member according to an embodiment.
Figure 2:
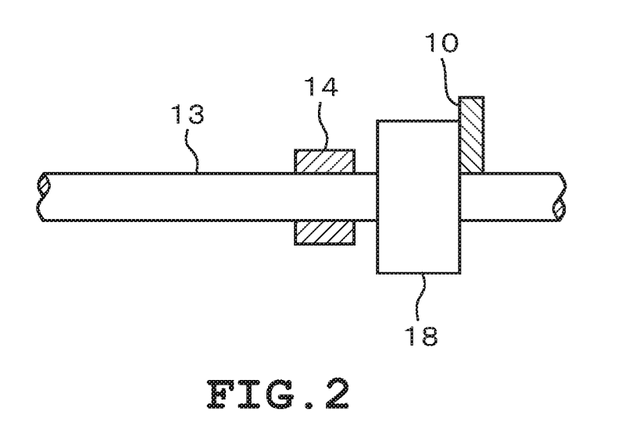
FIG. 2 is a diagrammatic view showing an example of a bearing apparatus in which the sliding member according to the embodiment is used as a thrust washer.
Figure 3:
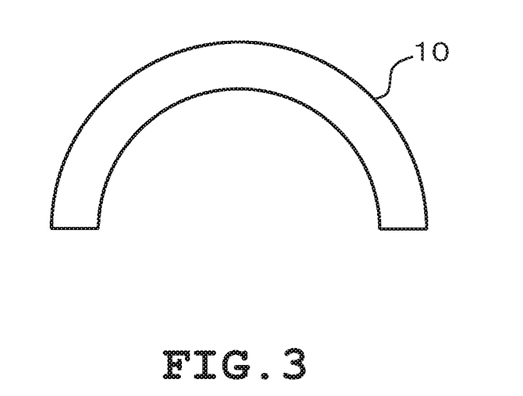
FIG. 3 is a diagrammatic view showing a halved thrust washer using the sliding member according to the embodiment.

A sliding member 10 includes a base layer 11 and a resin coating layer 12, as shown in FIG. 1. The resin coating layer 12 is provided on a slide surface of the base layer 11, that is, on the side facing a counterpart member. The resin coating layer 12 is formed on the slide surface of the base layer 11 and has a macroscopically uniform thickness. In the present embodiment, the sliding member 10 slides on a shaft member 13, as shown in FIG. 2. In the present embodiment, in particular, the sliding member 10 is a bearing member and can be used as a thrust washer, which receives force acting in the axial direction of the shaft member 13. That is, in the case shown in FIG. 2, the shaft member 13 moves not only in the rotational direction but also in the axial direction. The shaft member 13 is therefore not only rotatably supported by a rotary bearing 14 but also axially supported while rotating against the sliding member 10, which serves as a thrust washer. The sliding member 10, when used as a thrust washer, is formed in a semicircular ring shape, such as the halved shape shown in FIG. 3, or a full ring shape. The sliding member 10 is in contact with an axial end surface of a thrust collar 18 of the shaft member 13 and axially supports the shaft member 13. The thrust washer formed of the sliding member 10 and shown in FIG. 3 is presented by way of example. That is, the sliding member 10 is not necessarily the thrust washer having the shape shown in FIG. 3 and may be a plate-shaped thrust washer, may be integrated with a rotary bearing, or may be any of thrust washers having a variety of known shapes, such as a grooved washer, for example, a taper land groove, and a shape having a thickness that changes toward the circumferential edge, for example, a relief-shaped portion.

The sliding member according to the present embodiment may be used as a shaft member, that is, can be used as at least one of the bearing member and the counterpart member.

In the case where the sliding member according to the present embodiment is used as a bearing member, a bearing alloy layer 11, which is the base layer of the sliding member 10 shown in FIG. 1, is made, for example, of an aluminum alloy or a copper alloy. The sliding member 10 may further include a back metal layer 15, which is integrated with the bearing alloy layer 11. In this case, the sliding member 10 may include an intermediate layer that is not shown but is located between the bearing alloy layer 11 and the back metal layer 15. Further, the sliding member 10 may have a multilayer structure having at least three layers by adding another layer to the bearing alloy layer 11, the back metal layer 15, and the intermediate layer.

Figure 4:
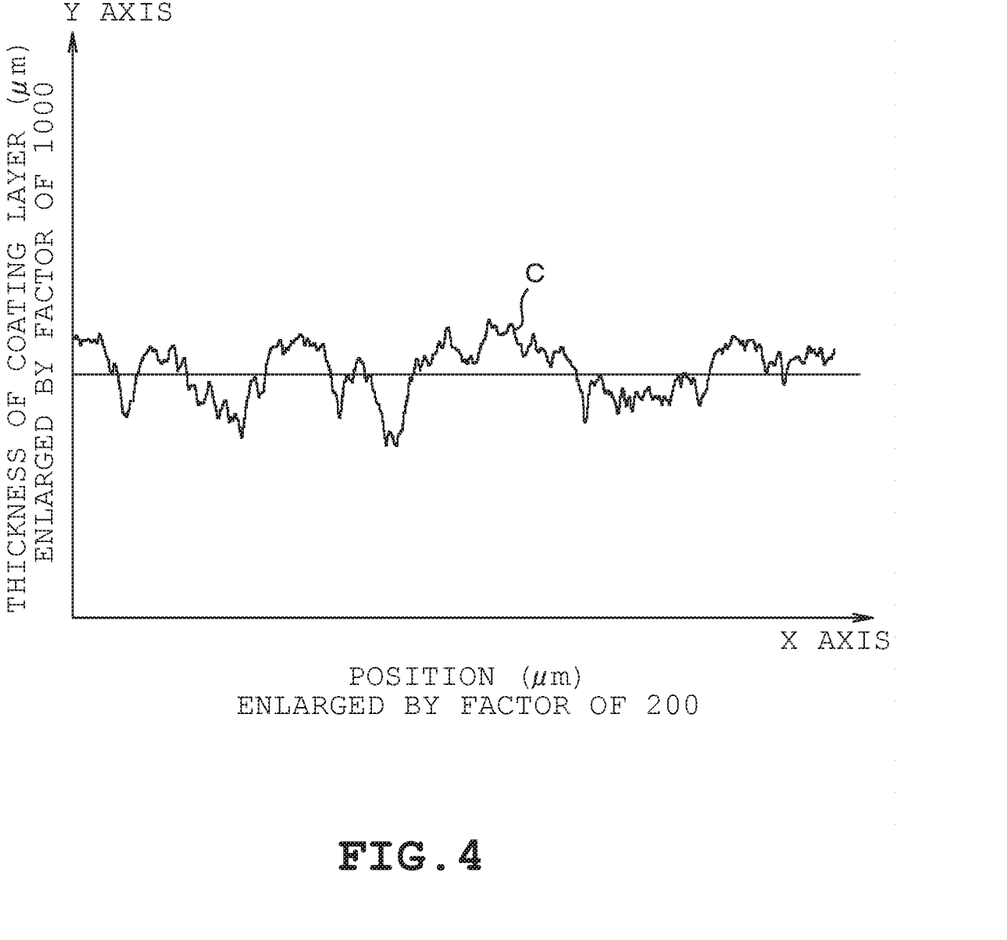
FIG. 4 is a diagrammatic view showing the shape line of the surface of a resin coating layer of the sliding member according to the embodiment.

The resin coating layer 12, which covers the bearing alloy layer 11, has microscopically minute protrusions and recesses on a surface 16, which forms the slide surface, instead of variation in macroscopic film thickness of the resin coating layer 12 itself, as described above. The surface 16 is one of the surfaces of the resin coating layer 12, that is, the surface on the side opposite the bearing alloy layer 11, as shown in FIG. 1. The surface shape of the resin coating layer 12 is acquired as a shape line C shown in FIG. 4. The shape line C represents the protrusions and recesses of the surface 16 of the resin coating layer 12 in a cross section containing a plane parallel to the thickness direction of the resin coating layer 12. The shape line C is expressed by using an X-Y coordinate system. Specifically, the X axis represents a position between two arbitrary points, and the Y axis represents the thickness direction of the resin coating layer 12, that is, the position in the Y-axis direction represents the depth and height of the protrusions and recesses of the surface 16. The shape line C therefore contains protrusions and recesses according to the surface shape of the resin coating layer 12. FIG. 4 is an enlarged view with the X axis enlarged by a factor of 200 and the Y axis enlarged by a factor of 1000.

Figure 5:
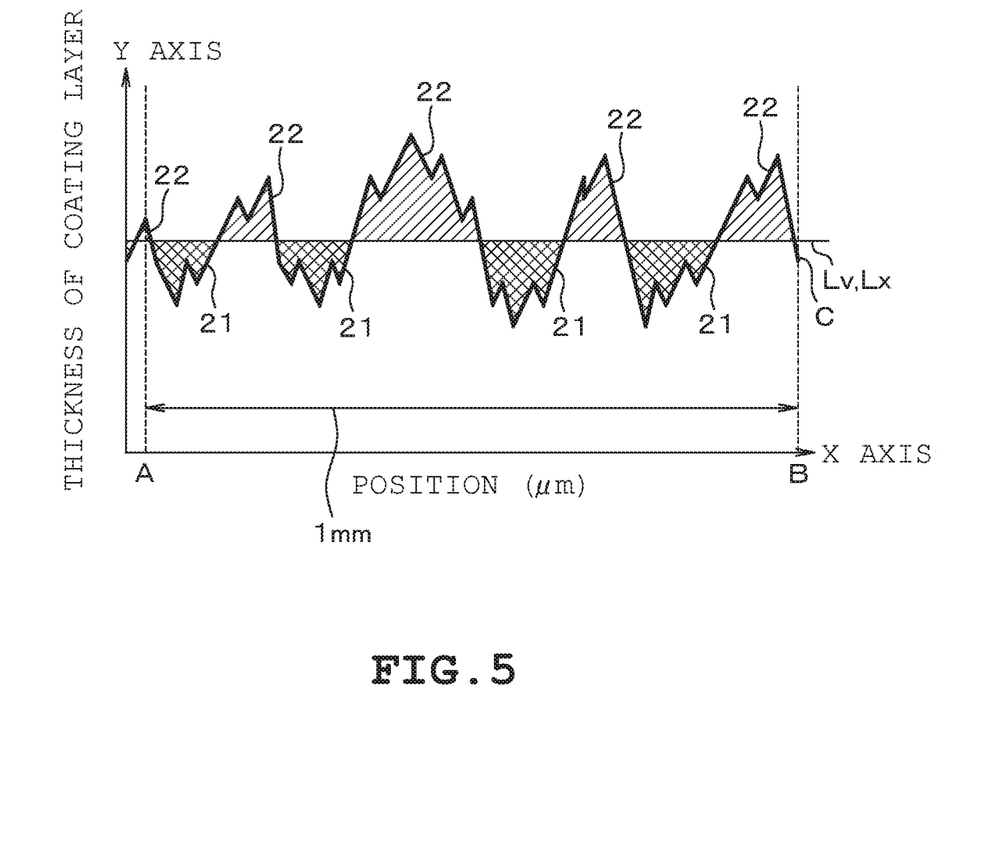
FIG. 5 is a diagrammatic view showing a simplified version of the shape line shown in FIG. 4 for the sake of illustration.

FIG. 5 diagrammatically shows a simplified version of the shape line C shown in FIG. 4 for the sake of illustration. The shape line C containing protrusions and recesses is divided by an imaginary straight line Lx, which is parallel to the X axis as a reference, into upper and lower parts in the Y-axis direction. In a case where the surface 16 of the resin coating layer 12 is microscopically flat, the surface 16 of the resin coating layer 12, the X axis, and the imaginary straight line Lx are parallel to one another. When the shape line C is divided by the imaginary straight line Lx, recessed regions that protrude downward from the imaginary straight line Lx and protruding regions that protrude upward from the imaginary straight line Lx are separated from each other. In FIG. 5, the recessed regions are "meshed," and the protruding regions are "hatched." The imaginary straight line Lx, which is so positioned that the sum S1 of the areas of the recessed regions is equal to the sum S2 of the areas of the protruding regions, is defined as a protrusion and recess average line Lv. That is, across the surface 16 of the resin coating layer 12, the sum S1 of the areas of the recessed regions that protrude downward from the protrusion and recess average line Lv is equal to the sum S2 of the areas of the protruding regions that protrude upward from the protrusion and recess average line Lv (S1=S2). The regions that protrude downward from the protrusion and recess average line Lv are defined as recesses 21, and the regions that protrude upward from the protrusion and recess average line Lv are defined as protrusions 22.

In the present embodiment, the performance of the sliding member 10 is verified by using an average area Sa per recess 21. The average area Sa per recess 21 is calculated by dividing the sum S1 of the areas of the recesses 21 that protrude downward from the protrusion and recess average line Lv between arbitrary two points by the number of recesses 21 present between the arbitrary two points.

In the present embodiment, the performance of the sliding member 10 is further verified by using the number M of recesses 21 in an arbitrary 1-mm range. The arbitrary 1-mm range is arbitrarily extracted from the region which is present between the arbitrary two points and where the average area Sa is calculated. For example, in a case where the average area Sa per recess 21 is calculated with the distance between the two points set at 10 mm, the number M of recesses 21 contained in an arbitrary 1-mm range extracted from the 10-mm range is determined. In this case, the average area Sa per recess 21 may instead be calculated with the distance between the two points set at 1 mm, and the number M of recesses 21 contained in the same 1-mm range may be determined. Still instead, on the basis of the total number of the recesses 21 contained in the 10-mm range, an average number M of recesses 21 per millimeter may be determined. As described above, the number M of recesses 21 may be calculated by any method as long as the recesses 21 involved in the calculation are present in a region that falls within the region where the average area Sa is calculated. In the example shown in FIG. 5, points A and B are set as the arbitrary two points. The distance between the points A and B is 1 mm.

In the present embodiment, the X axis is defined in the center position in the circumferential direction and the radial direction of the surface 16 of the sliding member 10 and defined as the direction tangential to the circumferential direction for measurement. The arbitrary two points can be arbitrarily adjusted in terms of the number of locations, the positions, and the direction in the measurement in consideration of the application of the sliding member 10.

Figure 6:
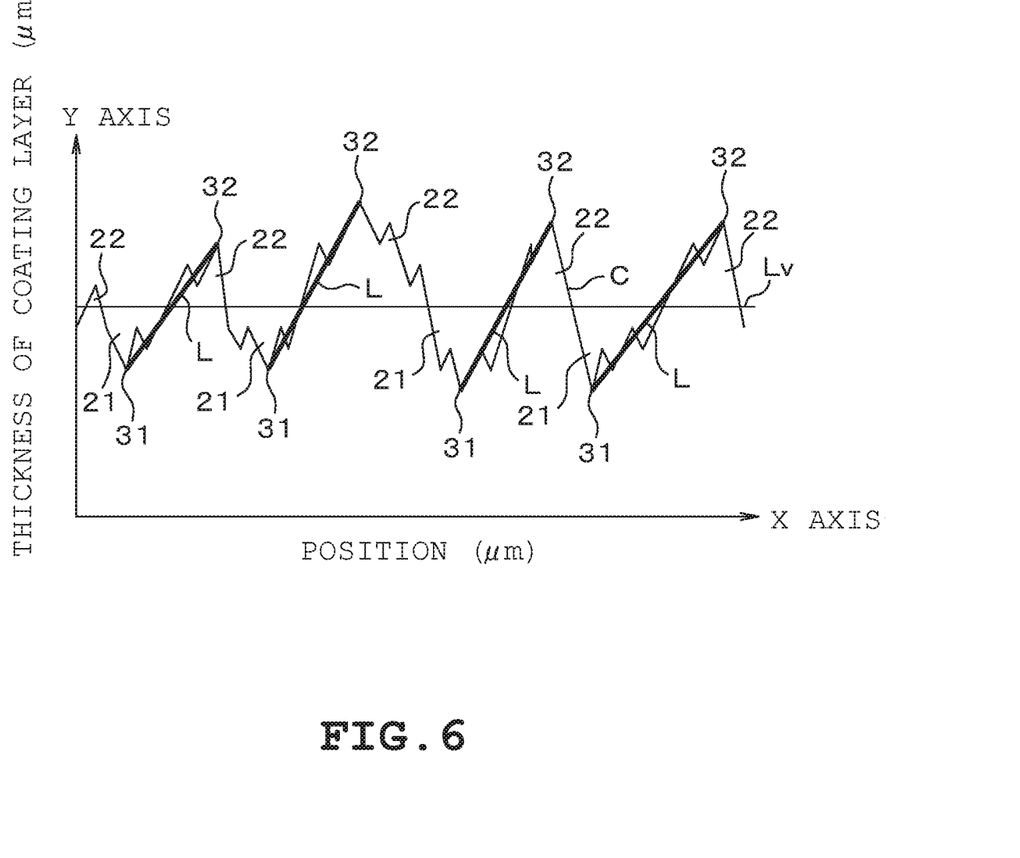
FIG. 6 is a diagrammatic view showing straight lines that connect the bottoms of recesses and the peaks of protrusions to each other along the shape line shown in FIG. 4.

In the present embodiment, the performance of the sliding member 10 is further verified by using the relationship between a recess 21 and a protrusion 22 adjacent to each other. Each of the recesses 21 has a bottom 31 in the deepest position of the recess 21, that is, in the position closest to the bearing alloy layer 11. The protrusion 22 adjacent to the recess 21 has a peak 32 in the highest position of the protrusion 22, that is, in the position farthest from the bearing alloy layer 11. As described above, when a recess 21 and a protrusion 22 are adjacent to each other with the protrusion and recess average line Lv therebetween, the bottom 31 of the recess 21 and the peak 32 of the protrusion 22 can be connected to each other with an imaginary straight line L. The gradient of the straight line L is the value calculated by dividing a measured distance between the bottom 31 of the recess 21 and the peak 32 of the protrusion 22 in the Y-axis direction by a measured distance between the bottom 31 and the peak 32 in the X-axis direction. The average of the gradients of the resultant straight lines L is an average gradient R.

EXAMPLES

Examples of the present embodiment will be described below.

Figure 7:
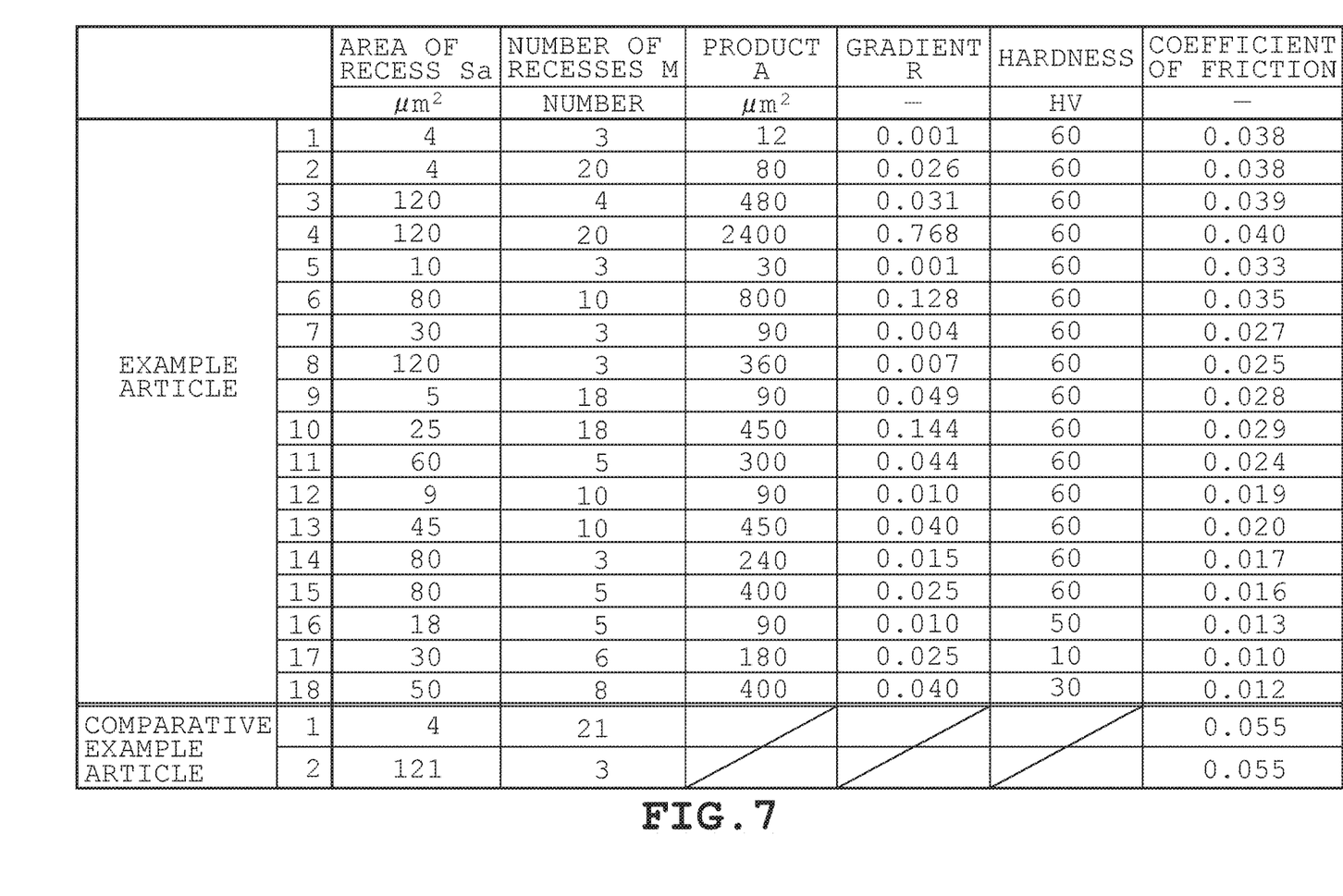
FIG. 7 shows examples of the sliding member according to the embodiment.

Methods for manufacturing Example Articles 1 to 18 and Comparative Examples 1 to 2 shown in FIG. 7 will first be described.

The resin coating layer 12 is formed on the slide surface of the bearing alloy layer 11 molded into a predetermined shape. Paint that forms the resin coating layer 12 is made of a resin which serves as a binder material and to which an additive, primarily a solid lubricant, is added. The binder material of the resin coating layer 12 is, for example, one or more of polyamide imide, polybenzimidazole, polyimide, polyamide, and other known resins. The binder material may be a polymer alloy. The solid lubricant is one or more of molybdenum disulfide, graphite, boron nitride, polytetrafluoroethylene, and other known compounds. As other additives, calcium carbonate, aluminum oxide, silicon dioxide, and other known compounds may be added. In the present example, polyamide imide and polyamide are used as the binder material, and molybdenum disulfide is used as the solid lubricant. In the resin coating layer 12, controlling the aggregation state of the additive particles that disperse in the resin binder material allows minute protrusions and recesses on the surface to be controlled.

For example, the paint that forms the resin coating layer 12 is filled in the space between a pair of surface members the distance between which is arbitrarily adjustable. Rotating at least one of the pair of surface members produces shear force acting on the paint filled in the space between the surface members. The shear force changes the aggregation state of the additive particles contained in the paint. As an example, the distance between the pair of the surface members is set at 10 μm, and the number of revolutions of the surface members relative to each other is set at 2000 rpm. Controlling the distance between the surface members and the number of relative revolutions allows the aggregation state of the additive particles contained in the paint that forms the resin coating layer 12 to be controlled. The period required for control of the aggregation state is set, for example, at a value ranging from about 10 to 60 minutes. The shorter the process period, the less the aggregation of the additive particles tends to be eliminated. A shorter process period therefore tends to cause the average area per recess, the number of recesses 21, and the average gradient R of the straight lines L to increase. On the other hand, the longer the process period, the more the aggregation of the additive particles is eliminated and fragmented. A longer process period is therefore likely to cause the surface of the resin coating layer 12 to be flatter. The control of the aggregation by using shear force is an example of pre-processing of the paint that forms the resin coating layer 12. The method for controlling the aggregation of the additive particles is not limited to the method described above and can be arbitrarily set.

The pre-processed paint is applied onto the slide surface of the bearing alloy layer 11. At this point, the paint is applied onto the bearing alloy layer 11 by using a known method, such as spraying, rolling, padding, and screening. When the applied paint cures, the resin coating layer 12 is formed on the slide surface of the bearing alloy layer 11. The resin coating layers in the Example Articles and Comparative Examples, which will be described later, are each formed to an average thickness of 5 μm.

Experiment conditions will next be described.

In the present embodiment, coefficients of friction are determined by using a thrust tester. Specifically, a thrust washer formed of a sliding member 10 in each of Example Articles and Comparative Examples is place in the thrust tester. The sliding member 10 placed in the thrust tester slides on a steel counterpart member to which a preset test load is applied. The coefficient of friction is calculated on the basis of the test load and the frictional force produced between the sliding member 10 and the counterpart member and measured in the sliding action.

Results of the test will next be described with reference to FIG. 7.

In each of Example Articles 1 to 4, the average area Sa per recess 21 ranges from 4 to 120 μm$^2$, and the number M of recesses 21 ranges from 3 to 20. In contrast, in Comparative Article 1, the average area Sa per recess 21 is 4 μm$^2$, and the number M of recesses 21 is 21. In Comparative Article 2, the average area Sa per recess 21 is 121 μm$^2$, and the number M of recesses 21 is 3. It is therefore apparent that lower coefficients of friction are achieved in Example Articles 1 to 4, in which the average area Sa per recess 21 ranges from 4 to 120 μm$^2$ and the number M of recesses 21 ranges from 3 to 20, than in Comparative Articles 1 and 2.

In Example Article 5, the average area Sa per recess 21 is 10 μm$^2$, and the number M of recesses 21 is 3. In Example Article 6, the average area Sa per recess 21 is 80 μm$^2$, and the number M of recesses 21 is 10. In Example Articles 5 and 6, the coefficients of friction are further reduced than in Example Articles 1 to 4. It is therefore apparent that the average area Sa per recess 21 more preferably ranges from 10 to 80 μm$^2$. It is further apparent that the number M of recesses 21 more preferably ranges from 3 to 10.

As described above, Example Articles 1 to 6 show that controlling the average area Sa per recess 21 and the number M of recesses 21 achieves a decrease in the coefficient of friction. That is, the average area Sa per recess 21 is controlled to range from 4 to 120 μm$^2$, and the number M of recesses 21 is controlled to range from 3 to 20. Controlling the average area Sa per recess 21 and the number M of recesses 21 as described above facilitates formation of an oil film and lowers the coefficient of friction. In particular, it has been shown that setting the average area Sa per recess 21 at a value ranging from 10 to 80 μm$^2$ and the number M of recesses 21 at a value ranging from 3 to 10 facilitates formation of an oil film and lowers the coefficient of friction.

In Example Articles 7 to 11, in which the conditions in Example Articles 1 to 6 are satisfied, an effect of the product A of the average area Sa per recess 21 and the number M of recesses 21 or A=Sa×M on the coefficient of friction has been studied. The conditions in Example Articles 7 to 11, in which the product A ranges from 90 to 450 μm$^2$, facilitate formation of an oil film and further lower the coefficient of friction.

In Example Articles 12 to 15, in which the conditions in Example Articles 7 to 11 are satisfied, an effect of the average gradient R of the straight lines L on the coefficient of friction has been studied. The conditions in Example Articles 12 to 15, in which the average gradient R of the straight lines L ranges from 0.01 to 0.04, facilitate formation of an oil film and further lower the coefficient of friction. When the average gradient R of the straight lines L is too small or too large, the lubricant held in the recesses 21 tends not to form an oil film in a satisfactory manner. For example, when the average gradient R of the straight lines L is too large, the lubricant held in the recesses 21 is unlikely to exit, resulting in a tendency to insufficient formation of an oil film. When the average gradient R of the straight lines L is too small, the lubricant is insufficiently held in the recesses 21, resulting in a tendency to insufficient formation of an oil film. Therefore, controlling the relationship between the recesses 21 and the protrusions 22 by using the average gradient R of the straight lines L as described above can facilitate formation of an oil film and lower the coefficient of friction.

In Example Articles 16 to 18, in which the conditions in Example Articles 12 to 15 are satisfied, an effect of the hardness of the resin coating layer 12 on the coefficient of friction has been studied. The conditions in Example Articles 16 to 18, in which the hardness of the resin coating layer 12 is smaller than or equal to 50 HV, lower contact resistance between the resin coating layer 12 and a counterpart member. As a result, the coefficient of friction is further lowered in Example Articles 16 to 18.

The present invention described above is not limited to the embodiment described above and can be implemented in a variety of other embodiments to the extent that they do not depart from the substance of the present invention.

The present embodiment has been described with reference to the case where the sliding member 10 is used as a thrust washer. The sliding member 10, when used as a thrust washer, reduces the coefficient of friction and therefore reduces friction against the counterpart member. Similarly, the sliding member 10 is not necessarily used as a thrust washer and can be used as sliding members 10 in other forms, such as a bearing apparatus that supports rotation and can provide the same advantage. The present embodiment has further been described with reference to the case where the resin coating layer 12 has a macroscopically uniform thickness. The resin coating layer 12 does not necessarily have a macroscopically uniform thickness and may, for example, be thicker in a central portion than both ends in the radial direction. Further, the base layer 11 may be provided with a groove, a hole, or any other indent. In this case, a surface that does not directly come into contact with a counterpart member may also be provided with the resin coating layer 12. Further, in the case where the base layer 11 is provided with an indent, the resin coating layer 12 may be provided only in the vicinity of the corner of the indent, or a portion in the vicinity of the corner of the indent may have an increased thickness.

The invention claimed is:

1. A sliding member, comprising:
   a bearing alloy layer; and
   a resin coating layer provided on a slide surface of the bearing alloy layer,
   wherein the resin coating layer is configured so that the resin coating layer has microscopically minute irregular protrusions and recesses on a surface thereof that forms the slide surface, instead of variation in macroscopic film thickness of the resin coating layer itself, a shape line is so defined as to represent a shape of a surface of the resin coating layer on a side opposite the bearing alloy layer by using an X-Y coordinate system formed of an X axis representing a position between arbitrary two points on the surface and a Y axis perpendicular to the X axis and representing a thickness direction of the resin coating layer, the shape line is divided by an imaginary straight line parallel to the X axis to set recessed regions that protrude downward from the imaginary straight line and protruding regions that protrude upward from the imaginary straight line, and the imaginary straight line so positioned that a sum of areas of the recessed regions is equal to a sum of areas of the protruding regions and is defined as a protrusion and recess average line,
   wherein regions that protrude downward from the protrusion and recess average line are defined as recesses,
   wherein regions that protrude upward from the protrusion and recess average line are defined as protrusions,
   wherein an average area Sa per recess ranges from 4 to 120 $\mu m^2$,
   wherein a number M of recesses between two points that are separate from each other by a distance of 1 mm ranges from 6 to 20,
   wherein the resin coating layer comprises additive particles added to a resin, which serves as a resin binder material,
   wherein the additive particles, which are dispersed in the resin binder material, establish the protrusions and recesses in the resin coating layer,
   wherein the additive particles comprise silicon dioxide,
   wherein hardness of the resin coating layer is smaller than or equal to 50 HV, and
   wherein, in each of the recesses, a straight line L is so defined as to connect a bottom of the recess to a peak of the protrusion adjacent to the recess, and an average gradient R of the straight line L ranges from 0.01 to 0.04.

2. The sliding member according to claim 1, wherein the average area Sa per recess ranges from 10 to 80 $\mu m^2$.

3. The sliding member according to claim 1, wherein the number M of recesses between the two points ranges from 6 to 10.

4. The sliding member according to claim 1, wherein a product A of the average area Sa per recess and the number M of recesses, expressed as A=Sa×M ranges from 90 to 450 $\mu m^2$.

5. The sliding member according to claim 4, wherein the product A ranges from 120 to 300 $\mu m^2$.

6. A paint that forms the resin coating layer of the sliding member according to claim 1.

7. A thrust washer comprising the sliding member according to claim 1.

8. A thrust washer comprising the sliding member according to claim 1, wherein the straight lines L extend along a direction in which the thrust washer rotates relative to a counterpart member.

9. An internal combustion engine comprising the sliding member according to claim 1.

10. An internal combustion engine comprising the thrust washer according to claim 7.

* * * * *